(12) United States Patent
Maes (10) Patent No.: US 7,403,763 B2
(45) Date of Patent: Jul. 22, 2008

(54) DEVICE AGENT

(75) Inventor: Stephane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 11/231,023

(22) Filed: Sep. 19, 2005

(65) Prior Publication Data

US 2006/0218395 A1 Sep. 28, 2006

Related U.S. Application Data

(63) Continuation-in-part of application No. 11/088,702, filed on Mar. 23, 2005.

(51) Int. Cl.
 *H04M 11/00* (2006.01)
(52) U.S. Cl. ............... 455/406; 455/405; 455/407; 455/408; 455/425
(58) Field of Classification Search ........ 455/406, 455/405, 407, 425, 402, 408; 709/217, 202; 209/217, 202; 703/167
See application file for complete search history.

(56) References Cited

U.S. PATENT DOCUMENTS

| 7,194,503 | B2* | 3/2007 | Shell et al. ............... 709/202 |
| 2002/0178381 | A1* | 11/2002 | Lee et al. ................. 713/201 |
| 2003/0027549 | A1* | 2/2003 | Kiel et al. ................. 455/405 |
| 2004/0044623 | A1* | 3/2004 | Wake et al. ............... 705/40 |
| 2005/0053241 | A1* | 3/2005 | Fan et al. ................. 380/270 |
| 2005/0154933 | A1* | 7/2005 | Hsu et al. ................. 713/320 |
| 2006/0040642 | A1* | 2/2006 | Boris et al. ............... 455/407 |
| 2006/0184640 | A1* | 8/2006 | Hatch ...................... 709/217 |

* cited by examiner

*Primary Examiner*—David Q Nguyen
(74) *Attorney, Agent, or Firm*—Townsend and Townsend and Crew LLP (57) ABSTRACT

Device agents and methods are disclosed. In one embodiment, the method comprises monitoring, at an access device, at least a subset of device activity. The method further comprises detecting an activity satisfies at least one condition specified by a policy and executing at least one action in the policy associated with the satisfied condition.

43 Claims, 8 Drawing Sheets

DEVICE AGENT

CROSS-REFERENCE TO RELATED APPLICATION

This application is a continuation-in-part of U.S. patent application Ser. No. 11/088,702, entitled "Device Billing Agent", filed Mar. 23, 2005, the details of which are hereby incorporated by reference.

BACKGROUND OF THE INVENTION

Wireless device users may elect to use a secure network, such as a virtual private network or a secure peer to peer network, to transmit communications. The communications over a secure network are encrypted before transmittal over the network. Thus, access providers are unable to detect or prevent certain types of communications from being transmitted.

The inability of a wireless network access provider to monitor and detect the types of communications transmitted from a wireless device may pose multiple problems for the access provider. As one example, a country may require the access provider to prevent its customers from accessing web sites that are considered illegal by the country. However, with secure communications, a customer may circumvent measures taken by the access provider to prevent illegal access. The failure to prevent the illegal access may result in heavy fines or penalties being imposed against the access provider.

As another example, an access provider may offer a variety of different billing models to customers. Access providers may charge customers based on data traffic, based on services used (which can include access of content), or a combination of data traffic and service usage. With each of these models, the access provider may use a variety of different rating schemes. The rating schemes may be per usage, per levels of usage, per subscription, or combination of these schemes. The billing models described above may be undermined when customers use secure networks to transmit communications and the access provider is unable to detect (and therefore bill or prevent) certain types of communications from being transmitted. For instances, access providers may wish to charge users one rate for internet access and a different rate for voice communications. In order to maintain this model, the access providers may want to control or prevent use of Voice over IP (VoIP) solutions. However, the access provider may be unable to detect VoIP communications when customers are using a secure network. As another example, access providers may want to charge users one rate for mobile e-mails and a different rate for Multimedia Messaging Service (MMS) messages. Again, customers may use a secure network to transmit email messages that cannot be detected by the access provider. Thus, the billing models used by access providers may be weakened or destroyed by the use of secure networks.

BRIEF SUMMARY OF THE INVENTION

Device agents and methods are disclosed. In some embodiments, the method comprises monitoring, at an access device (e.g., a wireless device, such as a mobile telephone), at least a subset of device activity. An activity that satisfies at least one policy condition is detected. After the activity is detected, an action in the policy associated with the satisfied condition is executed. In some aspects, the policy may have been received at the access device as part of an asynchronous communication transmitted to the access device.

The device activity may, in some aspects, be monitored by a device agent. At least a portion of the device agent may be stored on a secure component of the access device. By way of example, the secure component may comprise a Universal Subscriber Identity Module (USIM) or a Subscriber Identity Module (SIM). In further embodiments, the method may comprise determining the device agent is not active and preventing the access device from accessing a network Any number of different types of activities may satisfy condition(s) with policies. Merely by way of example, the detected activity may comprise a request to access a web site and the action may comprise blocking the request. Alternatively, the action may comprise redirecting the request to a second web site. As another example, the detected activity may comprise a request to access data and executing the action may comprise preventing the data access. As can be appreciated, a policy may specify a wide variety of different types of actions that are to be taken if a condition is satisfied (e.g., blocking, redirecting, transmitting a report to an access provider or other designated entity, etc.). Other exemplary conditions and actions are described below.

It should also be appreciated that a wide variety of activities may be monitored. In some embodiments, monitoring the device activity may comprise monitoring communications transmitted from the access device. In alternative or additional embodiments, monitoring the device activity may comprise monitoring web sites accessed by the access device, monitoring software installations on the access device, monitoring configuration activity on the access device, monitoring data usage, monitoring device provisioning communications, monitoring device management communications, and/or any other activity associated with the access device.

In other embodiments, a method is disclosed which comprises monitoring at an access device at least a subset of device activity. Reporting information about the device activity is determined. For instances, determining the reporting information may comprise determining at least one usage pattern associated with the subset of device activity. The reporting information is transmitted from the access device to an access provider.

The method may further comprise detecting, at the access device, an activity satisfies at least one condition associated with a policy. At least one action associated with the policy may then be executed. By way of example, the activity may comprise a request to access a web site and the action may comprise blocking the request or redirecting the request to a second web site.

In some embodiments, the method may further comprise receiving a request from the access provider for the reporting information and the reporting information may be transmitted in response to the request. Alternatively, transmitting the reporting information may comprise transmitting the reporting information at a predetermined time.

An access device is also disclosed. The access device comprises one or more policies. Each policy includes a logical combination of one or more conditions and one or more actions. The access device also comprises device agent logic and a communication interface. The device agent logic is configured to monitor device activities and to enforce the policies on the device activities. The communication component is configured to transmit and receive communications.

The access device, may in further aspects, comprise a secure component, such as a USIM or a SIM. At least a portion of the device agent logic may be stored on the secure component.

A further understanding of the nature and advantages of the present invention may be realized by reference to the remaining portions of the specification and the drawings.

BRIEF DESCRIPTION OF THE DRAWINGS

Illustrative embodiments in accordance with the invention are illustrated in the drawings in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
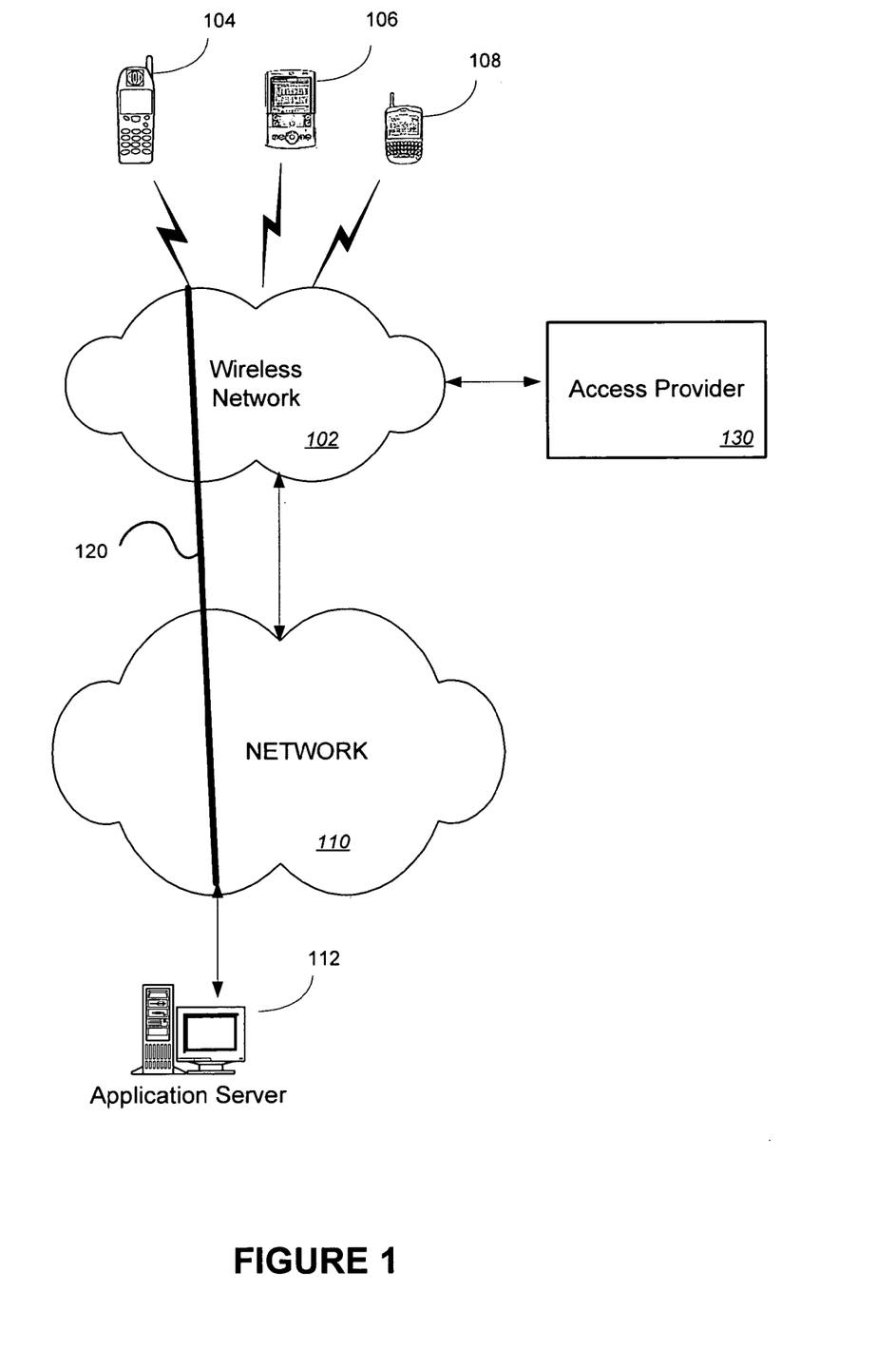
FIG. 1 illustrates an exemplary embodiment of a system that may use device agents to monitor and/or control device activities.

FIG. 1 illustrates an exemplary embodiment of a system that uses device agents to monitor device activities. In FIG. 1, a number of wireless mobile devices 104, 106, 108 are communicatively coupled to wireless network 102. Wireless mobile devices 106, 108, 110 may be mobile telephones, personal data assistants (PDA) with wireless capabilities, laptops with wireless capabilities, wireless devices for receiving email communications (e.g., Blackberry® devices), or other types of wireless device It should be appreciated that wireless network 102 may also have additional wireless mobile devices (not shown) connected thereto.

Wireless network 102 employs a communication format for communications on the network 102. By way of example, the communication format may be Code Division Multiple Access (CDMA), Time Division Multiple Access (TDMA), Global System for Mobile Communication (GSM), WiFi (IEEE 802.11), General Packet Radio Service (GPRS), WiMax, and other wireless network technologies. In addition to the communication format employed by the wireless network 102, wireless network 102 may also employ proprietary standards for communications.

Wireless network 102 may further be coupled with other networks, such as network 110. Network 110 may be a wide area network, such as the Internet, a local area network (LAN) or other type of network that may allow wireless devices 104, 106, 108 to communicate with application server 112 or other servers (not illustrated) coupled with network 110. Other types of networks, such as additional wireless networks provided by other network providers may also be coupled with wireless network 102.

In some embodiments, wireless devices 104, 106, 108 may be able to establish a secure network connection to one or more servers 122, to each other and/or or to other wireless devices communicating on wireless network 102 or other wireless networks. Secure network connection 120 may be virtual private networks (VPN), peer-to-peer networks, or other type of networks over which secured communications may be transmitted between devices. An exemplary secure network connection is illustrated by secure network connection 120 established between wireless device 104 and server 122. It should be appreciated that in alternative embodiments, wireless device 104 may not establish a secure network connection 120 to communicate with server 122.

As will be described in further detail below with reference to FIG. 2, wireless devices 104, 106, 108 may each include a device agent (not illustrated). Device agents may be used to enforce policies on device activities. By way of example, policies may be enforced on communications transmitted from and/or received by wireless devices 104, 106, 108, data usage, web sites accessed by the access device, software installations, configuration activity, and/or any other type of device activity.

In some embodiments, reporting information about the device activity or activities may be transmitted to a server associated with the access provider 130 of the wireless network. For example, in some embodiments, billing information about the communication (e.g., communication type, length) may be determined by the device agents and transmitted to the access provider 130 (e.g., a billing system 130 for the access provider). Thus, the access provider may be able to monitor the type and length of communications transmitted and received over a secure network connection 120 to wireless devices 104. This information may be used by the access provider to charge customers. As will be described in further detail below, other types of reporting information may also be transmitted to the access provider 130.

In addition to monitoring device activities, the device agents, may in some embodiments, control device activities. For instances, some types of device activities, such as access of a particular web site, may be prevented. Other types of actions that may be taken by a device activity in response to particular activities will be described in more detail below. It should be appreciated that in these embodiments, the device agents may or may not report information to access provider 130.

Although FIG. 1 illustrates an access provider 130 server communicatively coupled with wireless network 102, in alternative embodiments, the device agents may communicate with a server communicatively coupled with network 110 or different network. Additionally, in alternative embodiments, other types of access devices (non-wireless devices) used to access networks, such as network 110 or other type of network, may use device agents to communicate information to an access provider of the network. Thus, device agents may be implemented on any type of device used to access a network. Other variations are also contemplated.

Figure 2:
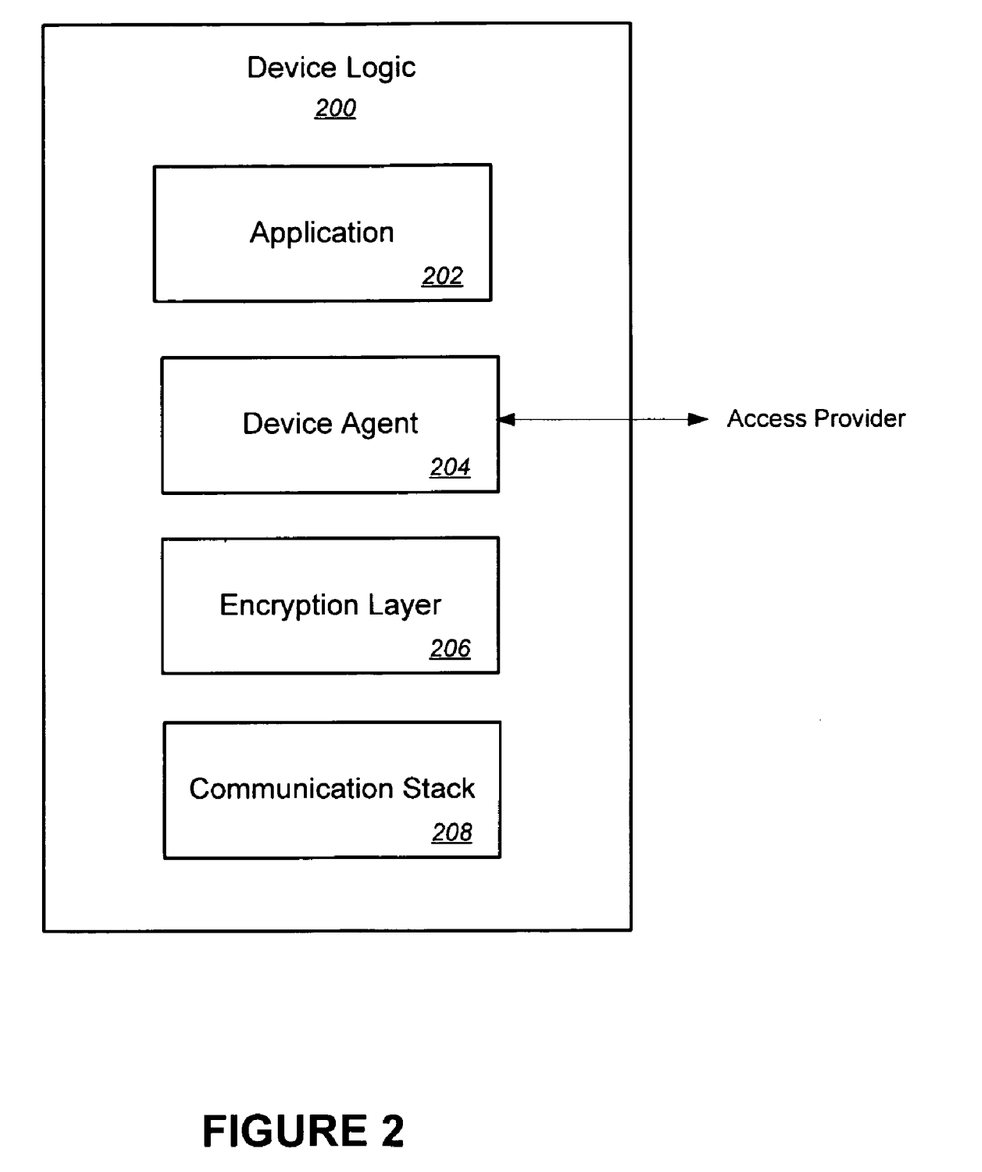
FIG. 2 is a block diagram of exemplary device logic that may be included on a wireless device or other type of access device.

FIG. 2 illustrates an exemplary block diagram of device logic 200 that may be included on a wireless device, such as those illustrated in FIG. 1, or other type of access device. Device logic 200 may include one or more applications 202, device agent 204 communicatively coupled with application(s) 202, encryption layer 206 communicatively coupled with device agent 204, and communication stack 208 communicatively coupled with encryption layer 206. Each of the components 202, 204, 206, 208 may include appropriate machine-executable instructions used to perform the functions of the component. It should be appreciated that in alternative embodiments, device logic 200 may include additional components, different components, or fewer components that illustrated.

Device agent 204 may be used to monitor device activities associated with the wireless device. Device activities that may be monitored by device agent 204 may include communications transmitted from and received by the access device, web sites accessed by the device, software installations, configuration activity, data usage, and/or any other type of activity associated with the wireless device (e.g., remote requests to perform tasks, such as device management or application provisioning).

As illustrated in FIG. 2, device agent may operate at a layer between application(s) 202 executing on the wireless device (e.g., user application(s) which may send or receive communications over a secure network) and encryption layer 206 used to encrypt/decrypt communications transmitted over a secure network. Thus, device agent 204 may be used to obtain information (e.g., billing information, content access requests) about communications transmitted by access device before the communications are encrypted by encryption layer 206 for transmission over the secure network. Device agent 204 may also be used to obtain information for communications received by access device after the received communications are decrypted by encryption layer 206. In alternative embodiments, device agent 204 may not operate at a different protocol layer and/or device logic 200 may not include encryption layer 206.

In some embodiments, device agent 204 may determine reporting information about the monitored device activity. The reporting information may be then be transmitted to the access provider. The reporting information may include device usage patterns, usage of protected data, content (e.g., web sites) accessed by the device, device configuration information, application configuration information, billing information (e.g., nature of communication packets, communication type, length of messages), and/or any other type of information useful to the access provider. The device agent 204 may transmit the reporting information as raw information and/or derived statistical information about the device activities.

Alternatively, or additionally, device agent 204 may be used to control device activities. For example, device agent 204 may block communications, such as requests to access a particular web site or a request for data. As another example, device agent 204 may redirect communications (e.g., redirect a request to access a first web site to a second web site). Other actions, such as disabling an application or service, may also be taken by device agent 204. The actions taken by device agent 204 may be specified in one or more policies enforced by device agent 204. A policy may be any logical combination of conditions and actions. A policy may be defined as one or more rules associated with a particular activity. In some instances, policies and/or policy updates may be received in asynchronous communications transmitted by the access provider to the device agent. As part of policy enforcement, device agent 204 may obtain information, transmit requests, and/or receive information from device(s) and/or system(s) external to wireless device.

Communication stack 208 may be used to format and transmit the encrypted communications in the wireless communication format and to route received wireless communications to encryption layer 206 for decrypting. Alternatively, or additionally, communication stack 208 may be used to format, transmit, and route communications that are not encrypted.

Device agent 204 may be integrated with an operating system installed on the access device. Communications to/from applications 202 using secure network may then be routed by the operating system through device agent 204. Thus, integrating the device agent 204 with the operating system may help ensure that applications 202 using secure networks may be monitored by device agent 204. In alternative embodiments, device agent 204 may not be integrated with the operating system.

In some embodiments, device agent 204 may include features which prevent or help detect tampering with the device agent 204. For example, measures may be taken to detect changes in operating systems (i.e., re-installation or new installation of an operating system), especially open source operating systems. A changed operating system may be detected by the access device failing authentication when reporting to the network provider or any other suitable mechanism. This may reduce or eliminate the possibility of users disabling the device agent by re-installing an operating system without the device agent. As another example, at least a portion of the device agent 204 logic may be stored on a secure component of the access device. In some aspects, the secure component may be a component needed to operate a wireless device. For instances, at least a portion of device agent logic 204 may be stored on a Subscriber Identity Module (SIM), a Universal Subscriber Identity Module (USIM)) or other secure hardware component of a wireless device or other type of access device. Other mechanisms and features may also be included to help reduce the possibility of accidental or purposeful disablement of device agent 204. In some embodiments, if the device agent 204 is tampered with, the wireless device may be prevented from accessing the network.

Figure 3:
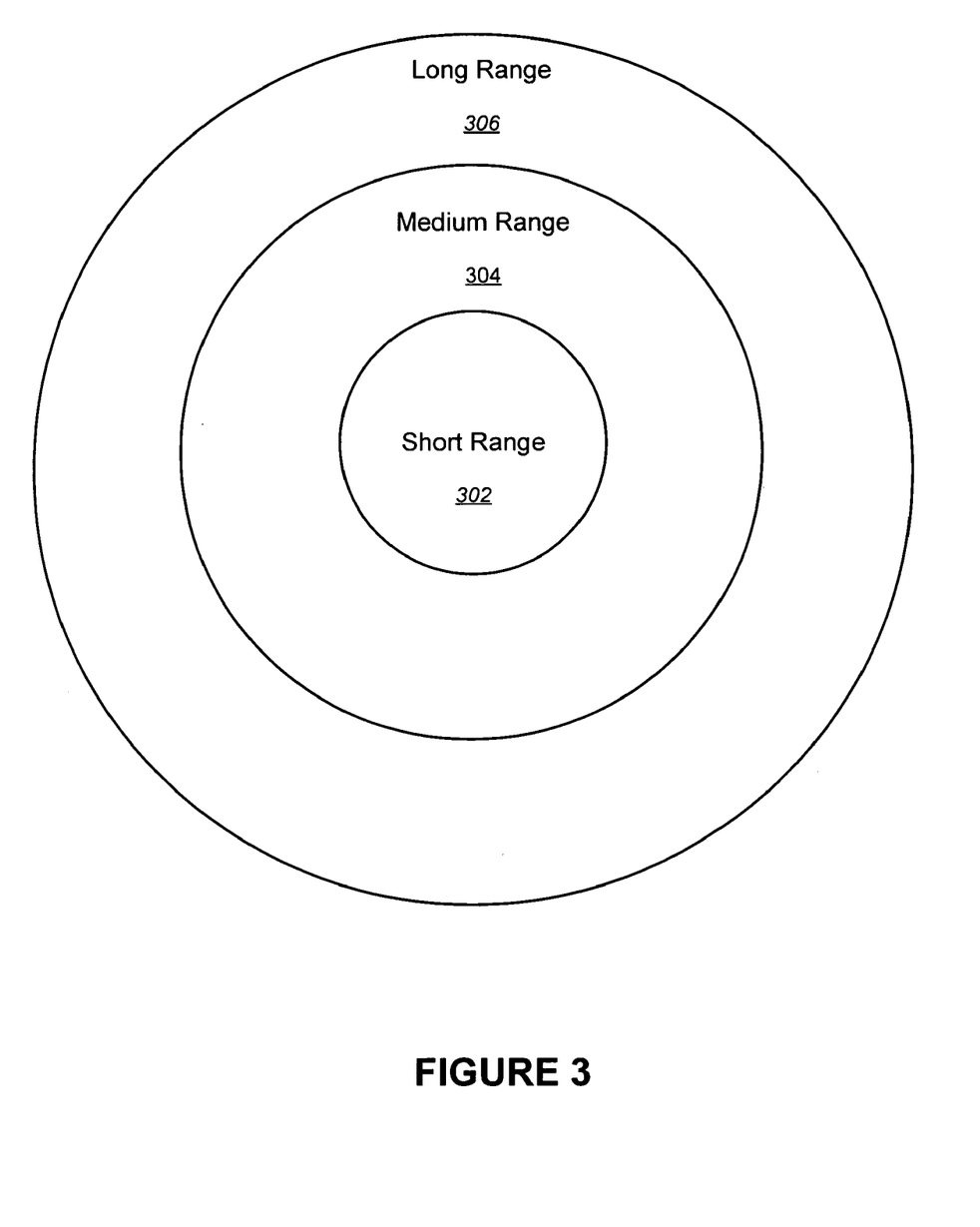
FIG. 3 illustrates a simplified comparison of network technologies.

FIG. 3 illustrates a simplified comparison of wireless network technologies which may use device billing agents. Wireless network technologies include long range networks 306, medium range networks 304, and short range networks 302.

Long range networks 306 may be referred to as wireless wide area networks (WWAN). WWAN networks are high power networks that typically have an access range on the order of several kilometers or more. WWAN technologies include cellular and related technologies such as GSM (Global System for Mobile Communications), GPRS (General Packet Radio Service), CDMA (Code Division Multiple Access), CDPD (Cellular Digital Packet Data), TDMA (Time Division Multiple Access), WCDMA (Wideband Code Division Multiple Access), and other similar types of technologies.

Medium range networks 304, also referred to as wireless local area networks (WLAN), are medium power networks that typically have an access range on the order of tens of meters. Exemplary WLAN technologies include the IEEE 802.11(a), (b), (e) and (g) technologies. Short range networks 302, also known as wireless personal area networks (WPAN), are typically low power networks that have an access range of about 10 meters or less. Examples of WPAN technologies include Bluetooth, HomeRF, IrDA and IEEE 802.15 technologies. It should be appreciated that networks, other than wireless networks, may be made accessible to a user via an access provider.

Figure 4:
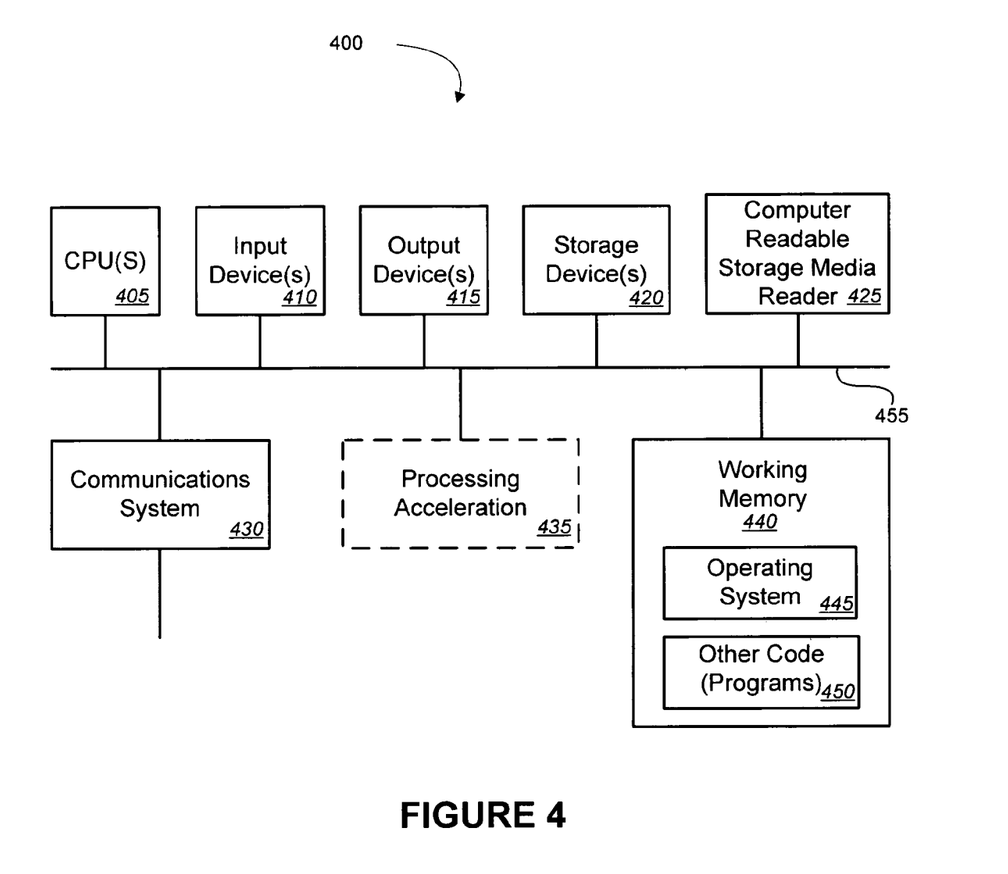
FIG. 4 is a block diagram of a computer system which may be used by an access provider to send and/or receive communications from device agents.

FIG. 4 illustrates one embodiment of a computer system 400 which may be used by an access provider to send and/or receive communications from device agents. The computer system 400 is shown comprising hardware elements that may be electrically coupled via a bus 455. The hardware elements may include one or more central processing units (CPUs) 405; one or more input devices 410 (e.g., a mouse, a keyboard, etc.); and one or more output devices 415 (e.g., a display device, a printer, etc.). The computer system 400 may also include one or more storage device 420. By way of example, storage device(s) 420 may be disk drives, optical storage devices, solid-state storage device such as a random access memory ("RAM") and/or a read-only memory ("ROM"), which can be programmable, flash-updateable and/or the like.

The computer system 400 may additionally include a computer-readable storage media reader 425; a communications system 430 (e.g., a modem, a network card (wireless or wired), an infra-red communication device, etc.); and working memory 440, which may include RAM and ROM devices as described above. In some embodiments, the computer system 400 may also include a processing acceleration unit 435, which can include a DSP, a special-purpose processor and/or the like The computer-readable storage media reader 425 can further be connected to a computer-readable storage medium, together (and, optionally, in combination with storage device(s) 420) comprehensively representing remote, local, fixed, and/or removable storage devices plus storage media for temporarily and/or more permanently containing computer-readable information. The communications system 430 may permit data to be exchanged with a network and/or any other computer or wireless device.

The computer system 400 may also comprise software elements, shown as being currently located within a working memory 440, including an operating system 445 and/or other code 450, such as an application program. The application programs may implement a billing system, device billing agent, or components of either. It should be appreciate that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed.

Figure 5:
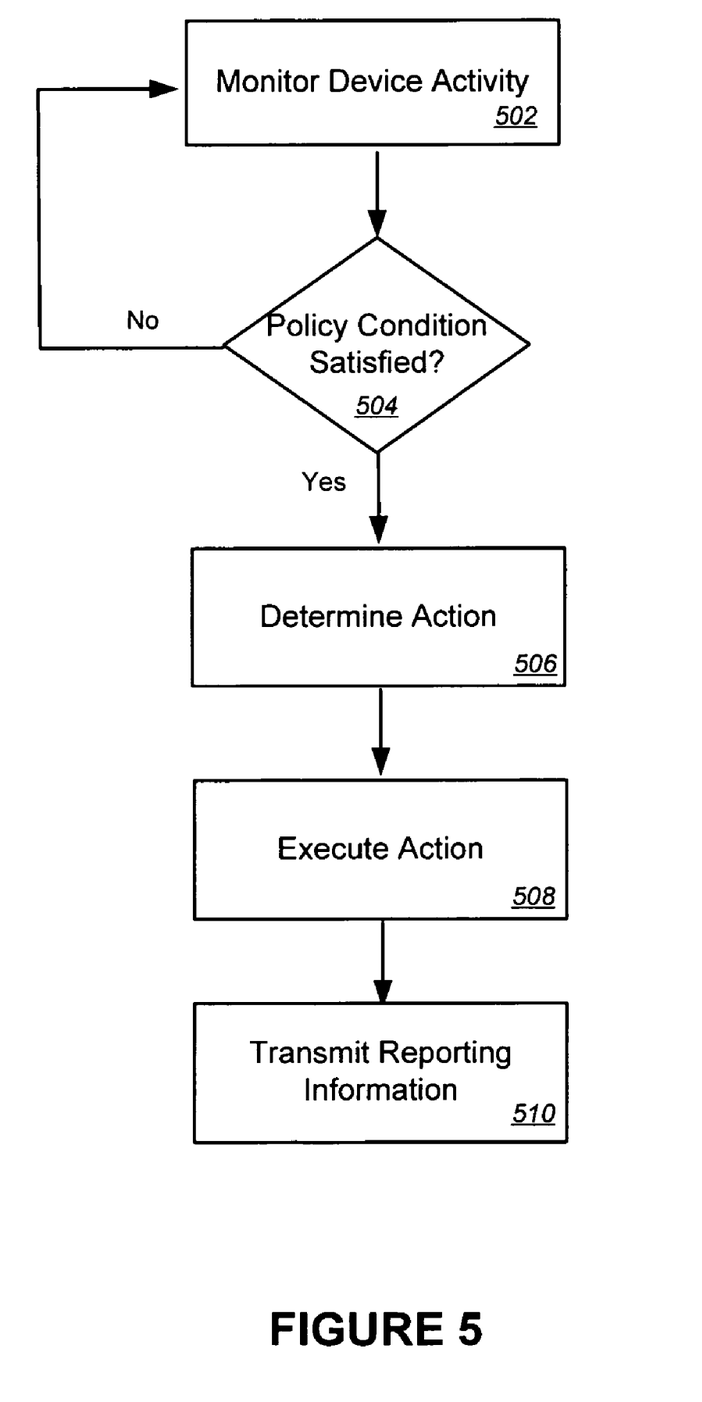
FIG. 5 is a flow diagram illustrating an exemplary method that may be used to enforce policies on device activities.

FIG. 5 illustrates an exemplary embodiment of a method that may be used by a device agent to enforce policies on device activities. As previously described, a device agent may be used to monitor 502 a variety of different types of device activities. In some instances, the device agent may be monitoring 502 the device activity for particular activities associated with policy conditions.

If a device activity that satisfies at least one policy condition is detected 504, the method may continue at block 506. By way of example, the activity associated with a rule may be a request to access a web site, a request to access data, installation of software, configuration activity, use of a particular service, inbound request to the device (e.g., device provisioning request, device management request), or any other type of activity associated with policy condition(s). Otherwise, the device agent may continue to monitor 502 device activity.

If an activity that satisfies a policy condition is detected 504, the device agent may determine 506 the action(s) that the policy specifies is/are to be executed. A variety of different types of actions may be associated in the policy with the satisfied condition. Exemplary actions may include blocking or preventing the activity (e.g., preventing access of a web site, preventing access to data, preventing use of a service, preventing a software installation), taking alternative action(s) (e.g., redirecting a request to access a web site to a different web site), reporting the activity, queering a remote system, and/or taking additional action(s).

After the action(s) to be taken are determined 506, the device agent may execute 508 the action(s). In some cases, reporting information about the device activity or other requested or designated information may be transmitted 510 to the access provider.

It should be appreciated that policies and/or policy updates may be received by the device agent at any time. Thus, an access provider, or other designate entities, may transmit asynchronous communications with policies or updates to policies to be enforced by the device agent. Other mechanisms may also be used to provide device agents with the rules.

In some aspects, a policy may not be associated with a particular activity. For example, a policy may specify that the device agent is to disable a particular service, remove software, change a device configuration, or other type of action. In these aspects, the policy may be enforced by the device agent upon receipt of the rule and/or at a time designated by the rule.

Figure 6:
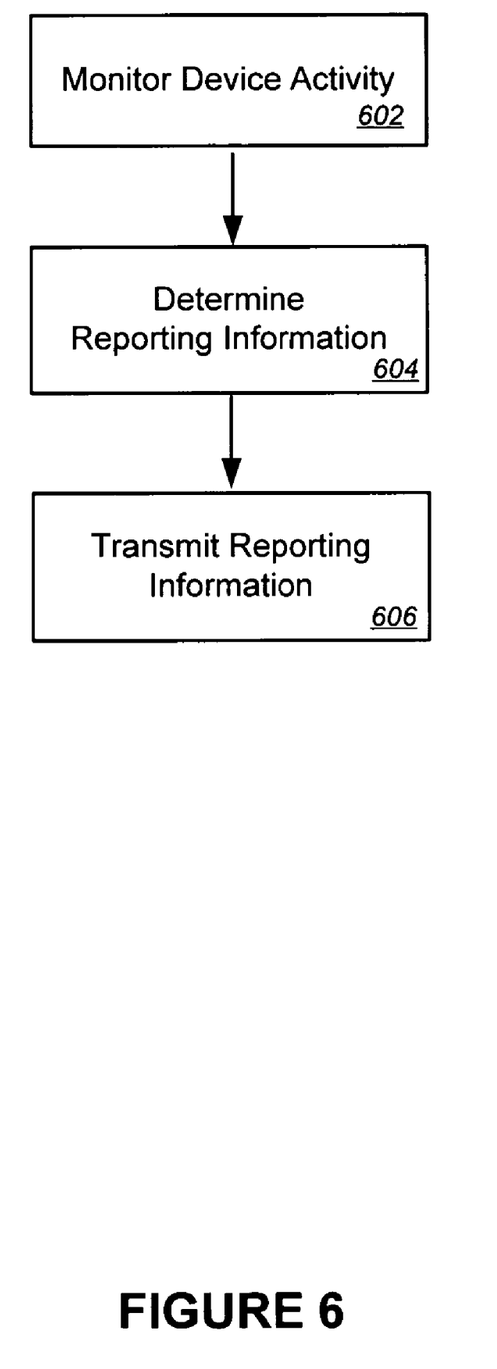
FIG. 6 is a flow diagram illustrating an exemplary method that may be used to obtain reporting information about device activities.

FIG. 6 is a flow diagram illustrating an exemplary method that may be used to obtain reporting information about device activities. A device agent may monitor 602 at least a subset of device activities that occur on an access device. By way of example, the device agent may monitor communications transmitted to/from the access device, data usage, software installations, configuration activity (e.g., device configuration/setup, application configuration/setup), content access (e.g., web sites accessed or attempted to be accessed), and/or any other type of device activity.

The device agent may then determine 604 reporting information about the device activity. For example, the reporting information may include usage patterns, usage of protected data, software configuration information, web sites accessed, billing information, or any other type of information about the monitored device activity.

The device agent may transmit 606 the reporting information. The information may be transmitted 606 to server(s) and/or service(s), such as a web service, associated with the access provider. The reporting information may be transmitted 606 in real time, in response to a request, and/or at predetermined time intervals. The reporting information may, in some aspects, be encrypted and/or signed by the device agent before it is transmitted. If the information is being transmitted 606 in response to a request, a requester associated with the request may first be authenticated to help prevent unauthorized transmittal of the information.

Figure 7:
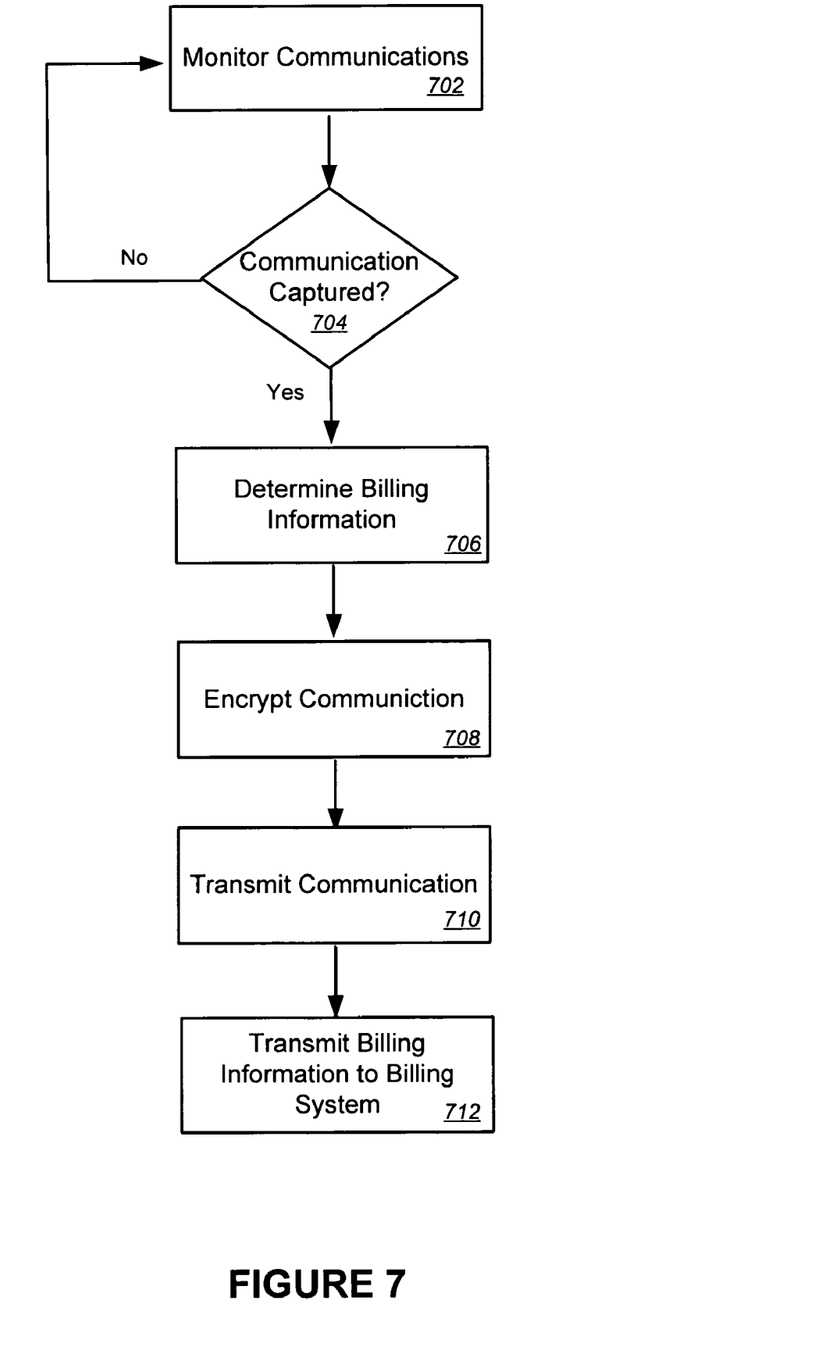
FIG. 7 is a flow diagram illustrating an exemplary method that may be used to obtain billing information for wireless communications.

FIG. 7 illustrates an exemplary method that may be used by a device agent to enforce a policy or policies to obtain information used to bill for wireless communications or other types of communications. As previously described, device agent may also enforce other types of policies.

A device agent, or other component of an access device, may monitor 702 communications transmitted from the access device. The device agent may also or alternatively monitor 702 communications received at the access device. The communications monitored 702 by the device agent may be communications transmitted by the access device (e.g., wireless device) and/or received at the access device over a secure network, such as a Virtual Private Network (VPN), peer-to-peer network, or other type of secure network over which encrypted communications are transmitted that may not be read by a provider of the network.

Communications may be monitored 702 by the device agent in a manner similar to a firewall application in which communications transmitted or received at an application layer of the wireless communications device are captured. In some embodiments, communications transmitted over a secure network may be captured 704 before the communications are encrypted and/or communications received at the access device may be captured 704 by the device agent after the communications have been decrypted. If a communication is captured 704 or otherwise detected, the method may continue at block 706. Otherwise, the device agent may continue to monitor 702 for communications.

The device agent may determine 706 billing information for each communication captured. Billing information may be any type of information about the communication that may be used by an access provider to charge a customer for services. For example, the billing information may include the length of the communication (e.g., data size, time length) and/or the type of communication being transmitted. The type of communication may be determined 706 by the device agent at a high level by determining the nature of the communication packet (e.g., data, MIME type, signaling) captured. In some aspects, the device agent may make lower level determinations about the communication type, for example, by classifying the type of data exchanged. Data classifications may vary depending upon the type of wireless device. Exemplary data classifications include Multi-Media Messaging Service (MMS) message, Short Message Service (SMS) message, Instant Message (IM), email message, or voice chat message. Other types of classifications may also be used by device agent. In alternative embodiments, the device agent may not classify data when it is determining 706 billing information about a communication, but may instead transmit billing information about the communication that may allow billing system to perform the classification of data.

In some embodiments, the method may include encrypting 708 the communication for transmittal over a secure network. In other embodiments, the communication captured by the device agent may not be transmitted over a secure network or may have been a communication received at the access device (which may have been decrypted) and thus block 708 may not be performed. In embodiments in which the communication is to be transmitted (over a secure or other type of network), the method may further include transmitting 710 the communication to a designated recipient.

The device agent transmits 712 the billing information determined 706 about the communication to a billing system or other designated component associated with the access provider. The information may be transmitted 712 approximately at the time the billing information is determined 706 for a communication (i.e., real time), in response to a request, or a predetermined time intervals. In some embodiments, the billing information may be encrypted and/or signed by the device agent before it is transmitted 712. If the information is being transmitted 712 in response to a request, a requester associated with the request may be first authenticated to help prevent unauthorized transmittal 712 of information.

In embodiments in which the billing information is transmitted at request or at predetermined time intervals, billing information determined 706 for communications over the time interval since a previous transmittal of billing information may also be transmitted 712. In some instances, the billing information transmitted 712 may include information about each of the communications transmitted and/or received. In other aspects, the device agent may transmit billing information summarizing the information about the communications. It should be appreciated that the device agent may not transmit 712 information for all communications captured. For instance, billing information may not be transmitted 712 for signaling or other similar types of communications.

In further aspects, device agent may perform a more active monitoring 702 of communications transmitted from access device. As one example, device agent may prevent certain types of communications from being transmitted and/or received by access device (e.g., voice over IP communications). Additional functions may also be performed by a device agent which monitors 702 communications transmitted and/or received by a access device.

Figure 8:
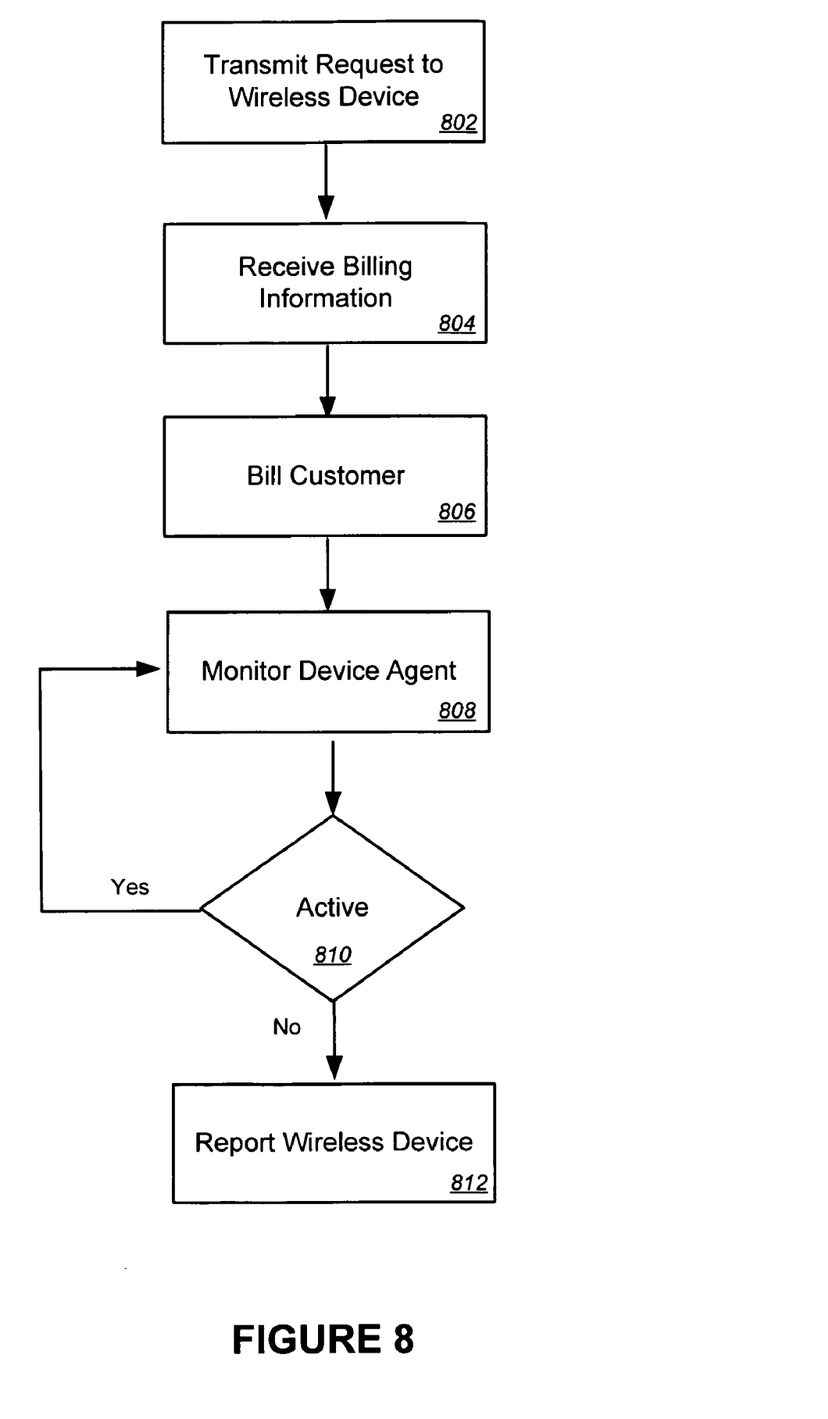
FIG. 8 is a flow diagram illustrating an exemplary method that may be used to bill customers of a wireless network provider or other type of network.

FIG. 8 illustrates an exemplary method that may be used to bill customers for communications transmitted and/or received by wireless devices. The method may also be used by other types of access providers to bill customers for communications transmitted and/or received by access devices using the network. In the embodiment of FIG. 8, a request is transmitted 802 to one or more wireless devices (or other type of access device) requesting billing information. The request may be transmitted 802 by a billing system or other system associated with a wireless network provider or other type of network provider. Billing information from one or more access devices may then be received 804. The billing information includes communication information for communications transmitted and/or received by access devices. As previously described, in alternative embodiments, the billing system may receive 804 the billing information at predetermined time intervals or real time, and thus block 802 may not be performed.

After the billing information is received 804, the billing system may authenticate the billing information. The billing system may use the received 804 billing information to bill 806 customers associated with wireless devices based at least in part on the billing information. The billing information 806 may be analyzed by the billing system to bill in accordance with an agreed billing model established between the customer and the wireless network provider. The analysis may include classifications of data transmitted by the access device, if not previously performed by device billing agent. In some aspects, billing system may consolidate multiple transmittals of billing information received 804 during a billing cycle into one bill. It should be appreciated that the billing system may bill 806 customers from pre-paid accounts, may generate bills to be paid by the customer, or may send information to another system to generate the bills.

Additional functions may also be performed by an access provider. In one embodiment, the wireless communications devices (or other type of access devices) may be monitored 808 to determine if the device agents are active. The monitoring 808 may be performed by billing system or other system associated with access provider. A variety of mechanisms may be used to monitor 808 the device agents. As one example, the device agents may be determined 810 to be inactive if a wireless device fails authentication. A failed authentication may be detected when a wireless device attempts to access the wireless network or other event. The failed authentication may indicate an operating system on the wireless device has been re-installed or other event has occurred which may have disabled the device billing agent. As another example, a device agent may be determined 810 to be inactive if it fails to respond to a request to transmit billing information or other request to verify that it is operating.

If the device agent is determined 810 to be inactive, the access device may be reported 812 to the access provider. Alternatively or additionally, the access device may be prevented from accessing all or a portion of the services available on the network.

In the foregoing description, for the purposes of illustration, methods were described in a particular order. It should be appreciated that in alternate embodiments, the methods may be performed in a different order than that described. Additionally, the methods may include fewer, additional, or different blocks than those described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
   monitoring, at an access device with a device agent, at least a subset of device activity;
   capturing an activity of the subset of device activity;
   determining, at the access device, whether the activity satisfies at least one condition specified by a policy;
   executing, at the access device, at least one action in the policy associated with the satisfied condition;
   determining whether the device agent has been tampered with; and
   in response to determining the device agent has been tampered with, preventing the access device from accessing a network.

2. The method of claim 1, wherein the access device is a wireless device.

3. The method of claim 2, wherein the wireless device comprises a mobile telephone.

4. The method of claim 1, wherein at least a portion of the device agent is stored on a secure component of the access device.

5. The method of claim 4, wherein the secure component comprises one of a Universal Subscriber Identity Module (USIM) and a Subscriber Identity Module (SIM).

6. The method of claim 1, further comprising:
   determining the device agent is not active; and
   preventing the access device from accessing the network.

7. The method of claim 1, wherein executing the action further comprises transmitting reporting information to an access provider.

8. The method of claim 1, wherein monitoring the subset of device activity comprises monitoring communications transmitted from the access device.

9. The method of claim 1, wherein monitoring the subset of device activity comprises monitoring web sites accessed by the access device.

10. The method of claim 1, wherein monitoring the subset of device activity comprises monitoring software installations on the access device.

11. The method of claim 1, wherein monitoring the subset of device activity comprises monitoring configuration activity on the access device.

12. The method of claim 1, wherein monitoring the subset of device activity comprises monitoring data usage.

13. The method of claim 1, wherein monitoring the subset of device activity comprises monitoring at least one of device provisioning communications and device management communications.

14. The method of claim 1, further comprising receiving, at the access device, an asynchronous communication, the asynchronous communication including the policy.

15. The method of claim 1, further comprising executing, at the access device, a device management action associated with a second policy.

16. The method of claim 1, wherein the activity comprises a request to access a web site.

17. The method of claim 16, wherein executing the action comprises blocking the request.

18. The method of claim 16, wherein executing the action comprises redirecting the request to a second web site.

19. The method of claim 1, wherein the activity comprises a request to access data and executing the action comprises preventing the data access.

20. The method of claim 1, wherein executing the action comprises executing the captured activity.

21. The method of claim 1, wherein the subset of device activity comprises activity associated with usage of the access device.

22. The method of claim 1, wherein the subset of device activity comprises activity associated with interaction with the access device.

23. The method of claim 1, wherein the subset of device activity comprises activity associated with an application on the access device.

24. The method of claim 1, wherein the subset of device activity comprises receiving a communication.

25. The method of claim 1, wherein determining whether the device agent has been tampered with is based on an authentication of the access device.

26. An access device comprising:
   one or more policies, each policy including a logical combination of one or more conditions and one or more actions;
   device agent logic adapted to monitor device activities, capture an activity on the device, determine whether the activity satisfies at least one condition specified by at least one of the one or more policies, execute at least one action in the policy associated with the satisfied condition; determine whether the device agent logic has been tampered with, and in response to determining the device agent logic has been tampered with, prevent the access device from accessing a network; and
   a communication interface adapted to transmit and receive communications.

27. The access device of claim 26, wherein the access device further comprises a secure component, and at least a portion of the device agent logic is stored on the secure module.

28. The access device of claim 26, wherein the secure component comprises one of a Universal Subscriber Identity Module (USIM) and a Subscriber Identity Module (SIM).

29. The access device of claim 26, wherein the at least one action comprises executing the captured activity.

30. The access device of claim 26, wherein the subset of device activity comprises activity associated with usage of the access device.

31. The access device of claim 26, wherein the subset of device activity comprises activity associated with interaction with the access device.

32. The access device of claim 26, wherein the subset of device activity comprises activity associated with an application on the access device.

33. The access device of claim 26, wherein the subset of device activity comprises receiving a communication.

34. A machine-readable medium having stored therein a series of executable instructions which, when executed by a processor, cause the processor to perform a process comprising:
  monitoring, at an access device with a device agent, at least a subset of device activity;
  capturing an activity of the subset of device activity;
  determining, at the access device, whether the activity satisfies at least one condition specified by a policy;
  executing, at the access device, at least one action in the policy associated with the satisfied condition;
  determining whether the device agent has been tampered with; and
  in response to determining the device agent has been tampered with, preventing the access device from accessing a network.

35. The machine-readable medium of claim 34, wherein executing the action further comprises transmitting reporting information to an access provider.

36. The machine-readable medium of claim 34, wherein monitoring the subset of device activity comprises monitoring communications transmitted from the access device.

37. The machine-readable medium of claim 34, wherein monitoring the subset of device activity comprises monitoring web sites accessed by the access device.

38. The machine-readable medium of claim 34, wherein monitoring the subset of device activity comprises monitoring software installations on the access device.

39. The machine-readable medium of claim 34, wherein monitoring the subset of device activity comprises monitoring configuration activity on the access device.

40. The machine-readable medium of claim 34, wherein monitoring the subset of device activity comprises monitoring data usage.

41. The machine-readable medium of claim 34, wherein monitoring the subset of device activity comprises monitoring at least one of device provisioning communications and device management communications.

42. The machine-readable medium of claim 34, further comprising receiving, at the access device, an asynchronous communication, the asynchronous communication including the policy.

43. The machine-readable medium of claim 34, further comprising executing, at the access device, a device management action associated with a second policy.

* * * * *

UNITED STATES PATENT AND TRADEMARK OFFICE
CERTIFICATE OF CORRECTION

PATENT NO. : 7,403,763 B2  
APPLICATION NO. : 11/231023  
DATED : July 22, 2008  
INVENTOR(S) : Maes It is certified that error appears in the above-identified patent and that said Letters Patent is hereby corrected as shown below:

Drawing  
On sheet 7 of 8, in Figure 7, Ref. Numeral 108, line 1, delete "communiction" and insert -- communication --, therefor.

In column 6, line 29, delete "(USIM))" and insert -- (USIM) --, therefor.

In column 7, line 21, after "like" insert -- . --.

In column 10, line 11, delete "a" and insert -- an --, therefor.

Signed and Sealed this

Twenty-second Day of December, 2009

David J. Kappos  
*Director of the United States Patent and Trademark Office*